Patented Oct. 9, 1951

2,570,385

UNITED STATES PATENT OFFICE 2,570,385

ADDITION PRODUCTS OF ESTERS COMPRISING A POLYHYDRIC ALCOHOL ESTERIFIED WITH DRYING OIL ACIDS AND AN ALKENOL-DICARBOXYLIC ACID MONOESTER AND PROCESS OF MAKING SAME

John B. Rust, Montclair, N. J., assignor, by direct and mesne assignments, of one-half to Montclair Research Corporation, Montclair, N. J., a corporation of New Jersey, and one-half to Ellis-Foster Company, a corporation of New Jersey No Drawing. Application January 28, 1946, Serial No. 643,964

16 Claims. (Cl. 260—23)

This invention relates to modified drying oils and to the process of making them. More particularly it relates to addition products obtained by reacting: (a) drying oil acid esters consisting of a polyhydric alcohol esterified with a polycarboxylic acid monoester of an unsaturated monohydric alcohol containing from 3 to 4 carbons and drying oil fatty acids, and (b) polymerizable compounds containing 1 or more $>C=CH_2$ groups and comprising liquid monomeric unsaturated polymerizable compounds containing at least one ethylenic linkage.

It is an object of this invention to provide modified drying oils, wherein the principal constituent is a highly unsaturated polymerizable ester consisting of a polyhydric alcohol esterified with a monoalkenyl ester of a polycarboxylic acid and an unsaturated fatty acid of the type derived from drying oils, which are heat advancing and which may be converted into insoluble and infusible masses by the application of heat or by the use of metallic driers.

It is a further object of this invention to provide a copolymer which is soluble in drying oils and which may be oil-reactive.

It is a still further object of this invention to provide modified drying oils which may be heated with rosin esters, phenolic resins, alkyd resins, natural resins, and the like, to form rapid drying coating compositions.

Other objects of this invention will become apparent from the following description.

There is disclosed in my copending application, Serial No. 571,549, filed January 5, 1945, Patent No. 2,464,602, and entitled "Drying Oil Acid Esters and Process of Making Same," of which the present application is a continuation in part, an unsaturated non-resinous polymerizable drying oil acid ester consisting of a polyhydric alcohol esterified with a monoalkenyl ester of a polycarboxylic acid and an unsaturated fatty acid of the type derived from drying and semi-drying oils.

It has been found that such unsaturated non-resinous polymerizable esters, having the highly unsaturated monoalkenyl ester of a polycarboxylic acid attached directly to the polyhydric alcohol in addition to the unsaturated fatty acids, are capable of combining with unsaturated polymerizable compounds of the type containing at least one $>C=CH_2$ group, thus providing products which range from oily esters to tough, hard materials. Such a combination probably takes place between the unsaturation of the alkenyl polycarboxylate and the vinyl type derivative, thus giving products useful to the art.

The products of this invention are prepared by heating together in a suitable reactor a highly unsaturated polymerizable ester (of a polyhydric alcohol esterified with a monoalkenyl ester of a polycarboxylic acid and an unsaturated fatty acid of the type derived from drying oils) and a vinyl or vinylidene derivative at 120–220° C. until there is substantially no further condensation of vapors observed. If desired, a solvent such as xylol, ethyl benzene or the like may be added during the reaction to regulate the reaction rate. Also, in practice it is at times useful to employ a peroxide catalyst such as benzoyl peroxide and the like to facilitate the addition.

The products of this invention range from viscous oils to hard, tough insoluble gels, the product obtained being dependent upon the proportions of the reactants used and the duration of the reaction. Several novel features of this invention are obvious. Where limited proportions of vinyl derivative are employed (i. e. 5%–10%) oily products are secured in the initial stages which may be combined with rosin esters, phenolic resins and the like to produce fast drying coating compositions. Where larger proportions of vinyl derivative are employed (i. e. 15–30%), viscous products result which may be reduced with solvents and added driers to give air-drying or baking compositions. Larger proportions of the vinyl derivative may be used to give resinous compositions. In addition, the products of this invention may be converted into infusible gel-like materials by further heating, by blowing with air, or by the use of ultra-violet light. Such gels are useful as linoleum binders, or as cold moldings when mixed with fillers.

The products of this invention may also be prepared by heating together in a suitable reactor the highly unsaturated, polymerizable ester, vinyl derivative, emulsifying agent, water and a polymerization catalyst such as aqueous hydrogen peroxide at 90–100° C., until an emulsion is obtained which forms a hard, tough film when spread upon a glass plate and baked at 100° C. for 10 to 15 minutes. These emulsion-type reaction products are useful when pigmented for emulsion paints and the like.

Numerous formulations of the unsaturated, polymerizable ester may be employed in the invention. In my copending patent application I have disclosed and claimed a number of esters from polyhydric alcohols, unsaturated fatty acids as derived from drying or semi-drying oils and dicarboxylic acid monoesters of unsaturated monohydric alcohols containing 3 or 4 carbon atoms.

Thus, as polyhydric alcohols, I may use pentaerythritol, polypentaerythritol, glycerol, diethylene glycol, dihydroxyethoxy benzene, sorbitol, mannitol and the like, the specific polyhydric alcohols set forth immediately above being hereinafter referred to as "Rust₁-polyhydric alcohol."

As unsaturated fatty acids, I may use cottonseed oil fatty acids, linseed oil fatty acids, soya bean oil fatty acids, dehydrated castor oil fatty acids, chinawood oil fatty acids, menhaden oil acids, and the like.

Among the monoalkenyl esters of polycarboxylic acids, I may use monoallyl maleate, monoallyl itaconate, monoallyl citraconate, monoallyl phthalate, monoallyl fumarate, monoallyl succinate, monoallyl sebacate, monoallyl adipate and the like, the specific acid groups in the specific esters set forth immediately above being hereinafter referred to as "Rust₂-dicarboxylic." In place of allyl alcohol I may also employ methallyl alcohol, crotyl alcohol, methyl vinyl carbinol and the like, the specific unsaturated alcohols set forth immediately above being hereinafter referred to as "Rust₃-unsaturated monohydric alcohol." Likewise, I may use unsaturated alcohol monoesters of Diels-Alder reaction products of conjugated dienes such as cyclopentadiene, isoprene, butadiene, and the like, with unsaturated dicarboxylic acids such as maleic anhydride, fumaric acid and the like.

The compounds above listed are representative of those which may be used in the process of the present invention and the list should not be construed as limiting since numerous other polyhydric alcohols, unsaturated monohydric alcohols, polycarboxylic acids, and unsaturated fatty acids may be employed in carrying out the teachings of the invention by those skilled in the art.

The unsaturated polymerizable polyhydric alcohol-drying oil acid mixed esters heretofore described may be combined with a number of unsaturated polymerizable compounds containing at least one $>C=CH_2$ group and free from drying oil acid radicals. Among such compounds may be included isopropenyl methyl ketone, vinyl acetate, acrylic acid esters of saturated monohydric alcohols, methacrylic acid esters of saturated monohydric alcohols, methacrylic acid esters of saturated monohydric alcohols, styrene, ethylene glycol ester of monoallyl maleate, diethylene glycol ester of monoallyl maleate, glycerol esters of monoallyl maleate, pentaerythritol ester of monoallyl maleate, polyhydric alcohol esters of monoallyl phthalate, polyhydric alcohol esters of monoallyl sebacate, di(hydroxyethoxy) benzene diester of monoallyl maleate, diallyl maleate, diallyl phthalate, diallyl fumarate, diallyl sebacate, and the like, the specific unsaturated polymerizable compounds set forth immediately above being hereinafter referred to as "Rust₄-unsaturated polymerizable compounds containing an ethylenic group."

The following examples are given in the way of illustration only and should not be limited, as numerous derivations are possible within the scope of the invention.

Example 1.—400.8 parts of soya bean oil acids and 64.8 parts of glycerol are heated together in a 3-neck flask equipped with a stirrer, thermometer, and an outlet-tube leading to a water-cooled condenser. Heating at 180–195° C. is carried out by means of an oil bath while collecting 8.5 parts of water. 88.8 parts of monoallyl maleate and 2.2 parts of paratoluene sulphonic acid are now added and heating continued at 170–180° C. for an additional 5 hours. A light-colored, clear oil is obtained which possesses an acid number of 21. This oil may be heated to 282° C. over a period of 32 minutes to form an insoluble, infusible gel.

A. 135 parts of the oil of Example 1 and 15 parts of styrene are heated together in a 3-neck flask equipped with a stirrer, thermometer, and air condenser as follows:

| | |
|---|---|
| 0 minutes | —25° C. (started heating) |
| 15 minutes | —140° C. |
| 22 minutes | —160° C. (rapid thickening) |
| 30 minutes | —180° C. gelled |

A soft, crumby gel is secured which is insoluble in hydrocarbons VM and P naphtha, acetone and ethyl benzene.

Example 2.—300 parts of raw linseed oil acids and 48 parts of glycerol are heated together at 200–240° C. in an atmosphere of carbon dioxide for approximately 10 hours, the acid number of the resulting partial ester being about 5. 65.4 parts of monoallyl maleate and 2.067 parts of para toluene sulphonic acid are added and heating continued at 120–180° C. until the acid number of the resulting oil is approximately 15. (12 hours at 120–180° C.)

A. 135 parts of the above oil and 15 parts of diallyl maleate are heated together in the presence of 0.2 part of benzoyl peroxide employing a 3-neck flask equipped with a stirrer, thermometer, and air condenser for 1¾ hours at 160–180° C. A light-colored viscous syrup formed.

10 parts of the above reaction product and 10 parts of xylol containing 0.16% lead as lead naphthenate and 0.02% cobalt as cobalt naphthenate are mixed together to form a clear solution. The oil solution air dried to a dust-free film in 1¼ hours, and tack-free in 4 hours.

B. 135 parts of the oil of Example 2 and 15 parts of a monomeric ester prepared from one mole of diethylene glycol and two moles of monoallyl maleate are heated together in a 3-neck flask equipped with a stirrer, thermometer, and air condenser at 160–180° C. for 35 minutes. A very viscous oil is obtained.

10 parts of the above modified oil and 10 parts of xylol containing 0.16% lead as lead naphthenate and 0.02% cobalt as cobalt naphthenate are mixed together to form a clear solution. A film of the oil after drying for one hour is dust-free and after 3¾ hours is tack-free.

Example 3.—200 parts of linseed oil acids, 30.8 parts of glycerol, 40 parts of monoallyl maleate, 1.2 parts of paratoluenesulphonic acid and 30 parts of xylol are placed in a 3-neck flask equipped with a thermometer, stirrer, and water condenser attached to a water trap. Heating is carried out by means of an oil bath at 150–160° C. for 6 hours, there being collected 17.1 ml. of water. The resulting oil is washed free of catalyst and then heated at 120° C. for 1 hour under reduced pressure. The resulting oil is clear and light colored.

To 10 parts of the above oil is added 10 parts of xylol containing 0.16% of lead as lead napthenate, and 0.02% of cobalt as cobalt naphthenate thus securing a clear solution. A film of the oil air dried for 15 hours gives a hard tough film which possesses a Sward rocker hardness of 31.

125 parts of the above drying oil and 12.5 parts of styrene are heated together in a 3-neck flask provided with a stirrer, thermometer, and air condenser at 170–180° C. for 2 hours. A light-colored clear oil is obtained.

To 10 parts of the above oil is added 10 parts of xylol containing 0.16 part of lead as lead napthenate, and 0.02 part of cobalt as cobalt napthenate thus making a clear solution. A film of the oil air dried for 15 hours gives a hard, tough film which possesses a Sward rocker hardness of 67. A film of the oil baked at 110° C. for 15 minutes is exceedingly hard and clear possessing a Sward rocker hardness of 49.

*Example 4.*—834 parts of soya bean oil acids and 136 parts of pentaerythritol are heated together in a 3-neck flask, equipped with a stirrer, thermometer, and an outlet tube leading to a water cooled condenser set up for distillation, for 6 hours at 190–200° C. 156 parts of monoallyl maleate are added and heating continued at 180° C. for an additional 4 hours. A light-colored relatively non-viscous oil is secured having an acid number of 15.

A. 150 parts of the above oil, 15 parts of ethyl acrylate and 0.825 part of benzoyl peroxide are heated together in a 3-neck flask, equipped with a stirrer, thermometer, and water-cooled condenser, for 12 hours. A light-colored, clear, exceedingly viscous material is obtained.

20 parts of the above modified oil and 20 parts of xylol containing 0.16% lead as lead naphthenate and 0.02% cobalt as cobalt naphthenate are mixed together to give a clear solution. A film of the oil air dried for 15 hours was clear and hard.

B. 150 parts of the above oil and 12.5 parts styrene are heated together in a 3-neck flask, equipped with a stirrer, thermometer, and air condenser, for 1½ hours at 160–180° C. A light-colored, viscous oil is secured. A film of the oil containing 0.16% lead as lead napthenate and 0.02% cobalt as cobalt napthenate air dries to a dust-free film in 1 hour and to a tack-free film in 4¼ hours. After 15 hours the film of this oil is extremely hard and tough and possesses a Sward rocker hardness of 49.

15 parts of ester gum and 30 parts of the above oil are heated rapidly to 280° C. over a period of 30 minutes. The resulting varnish base is cooled to 250° C. and held at this temperature until a desirable body is imparted to the base. 45 parts of VM and P naptha containing 0.16% lead as lead napthenate and 0.02% cobalt as cobalt napthenate are added. A clear light-colored varnish is secured. The varnish air dries to a dust-free film in 1 hour and was tack-free after 3½ hours. After 15 hours a hard, tough film is secured which possesses a Sward rocker hardness of 77.

C. 125 parts of the above oil and 12.5 parts of vinyl acetate are heated together under reflux in the presence of 1.3 parts of benzoyl peroxide for 15 hours at 160° C. The resulting oil is further heated for ½ hour at 100° C. under reduced pressure to remove any uncombined vinyl acetate. 132 parts of a clear, light colored, viscous oil are secured. This oil containing 0.16% lead as lead naphthenate and 0.02% cobalt as cobalt naphthenate was air dried for 15 hours to give a hard, tough film.

D. 125 parts of the above oil and 12.5 parts of a polymeric ester prepared from one mole of glycerol and 3 moles of monoallyl maleate are heated together in a 3-neck flask, equipped with a thermometer, air condenser, and stirrer to 200° C. in 30 minutes. A clear, viscous oil formed which, when mixed with 0.16% lead as lead naphthenate and 0.02% cobalt as cobalt naphthenate gave a hard, tough film when air dried for 15 hours.

E. 75 parts of the above oil and 37.5 parts of a polymeric ester prepared from one mole of diethylene glycol and 2 moles of monoallyl maleate are heated together under reflux in a 3-neck flask, equipped with a stirrer, thermometer, and air condenser, to 220° C. in 30 minutes. A clear, tough material is secured.

20 parts of this reaction product and 20 parts of xylol containing 0.16% lead as lead naphthenate and 0.20% cobalt as cobalt naphthenate are mixed together to form a clear solution. The solution air dried for 15 hours gives a clear, hard, tough film.

*Example 5.*—125.1 parts of soya bean oil acids, 20.4 parts of pentaerythritol, 30.4 parts of monoallyl phthalate, and 0.70 part of paratoluenesulphonic acid are heated together in a suitable reactor equipped with a thermometer, stirrer, outlet tube leading to a water condenser, and an inlet tube for carbon dioxide. Heating is carried out to 200° C. over a period of 3 hours and maintained at 190–200° C. for an additional 3½ hours. A light-colored oil is obtained which is washed with denatured alcohol, and finally heated to 150° C. to expel the solvent. A light-colored, clear, relatively non-viscous oil results having an acid number of 14.

A. 47.5 parts of the above oil and 2.5 parts of diallyl maleate are heated together in a suitable reactor equipped with a stirrer, air condenser, and thermometer at 240–250° C. for 2 hours. The resulting oil is viscous and light-colored. 25 parts of VM and P naphtha containing 0.16% lead as lead naphthenate and 0.02% cobalt as cobalt naphthenate are added. The solution after air drying for 24 hours was flexible and non-tacky.

B. 47.5 parts of the above oil and 2.5 parts of styrene are heated together in a suitable reactor equipped with a stirrer, air condenser and thermometer to 220° C. over a period of 1½ hours. The resulting oil is viscous and light colored. 25 parts of VM and P naphtha containing 0.16% lead as lead naphthenate and 0.02% cobalt as cobalt naphthenate are added. The solution after air drying for 24 hours was flexible and non-tacky.

Having thus set forth my invention, I claim:

1. A modified drying oil acid ester comprising the addition product obtained by reacting (A) a monomeric, non-polymerized mixed ester consisting of the esterified product of a mixture of (a) a drying oil acids—polyhydric alcohol ester containing free hydroxyl groups in which the alcohol is selected from the class consisting of pentaerythritol, polypentaerythritol, glycerol, diethylene glycol, dihydroxyethoxybenzene, sorbitol, and mannitol, and (b) a dicarboxylic acid monoester of an unsaturated monohydric alcohol containing 3 to 4 carbon atoms in which the acid is selected from the class consisting of maleic, itaconic, citraconic, phthalic, fumaric, succinic, sebasic, and adipic acids, and the alcohol is selected from the class consisting of allyl, methallyl, crotyl alcohols, and methyl vinyl carbinol; with (B) an unsaturated polymerizable compound containing an ethylenic group selected from the class consisting of isopropenyl methyl ketone, vinyl acetate, acrylic acid esters of saturated monohydric alcohols, methacrylic acid esters of unsaturated monohydric alcohols, methacrylic acid esters of saturated monohydric alcohols, styrene, ethylene glycol ester of monoallyl maleate, diethylene glycol ester of monoallyl maleate, glycerol esters of monoallyl maleate, pentaerythritol ester of monoallyl maleate, polyhydric alcohol esters of monoallyl phthalate, polyhydric alcohol esters of monoallyl sebacate, di(hydroxyethoxy) benzene diester of monoallyl maleate, diallyl maleate, diallyl phthalate, diallyl fumarate, and diallyl sebacate.

2. A modified drying oil acid ester as set forth in claim 1 in which the dicarboxylic acid is maleic acid.

3. A modified drying oil acid ester as set forth in claim 1 in which the mono-ester is mono-allyl maleate.

4. A modified drying oil acid ester as set forth in claim 1 in which the drying oil acids are linseed acids and the mono-ester is mono-allyl maleate.

5. A modified drying oil acid ester as set forth in claim 1 in which the drying oil acids are soya bean oil acids and the mono-ester is mono-allyl maleate.

6. The product of claim 1 wherein the polymerizable compound containing an ethylenic group is styrene.

7. The product of claim 1 wherein the polymerizable compound containing an ethylenic group is vinyl acetate.

8. The product of claim 1 wherein the polymerizable compound containing an ethylenic group is ethyl acrylate.

9. The process of making a modified drying oil acid ester which comprises heating at between 120° and 220° C. a mixture containing: (A) a monomeric, non-polymerized mixed ester consisting of the esterified product of a mixture of (a) a drying oil acids—polyhydric alcohol ester containing free hydroxyl groups in which the alcohol is selected from the class consisting of pentaerythritol, polypentaerythritol, glycerol, diethylene glycol, dihydroxyethoxybenzene, sorbitol, and mannitol, and (b) a dicarboxylic acid monoester of an unsaturated monohydric alcohol containing 3 to 4 carbon atoms in which the acid is selected from the class consisting of maleic, itaconic, citraconic, phthalic, fumaric, succinic, sebacic, and adipic acids, and the alcohol is selected from the class consisting of allyl, methallyl, crotyl alcohols, and methyl vinyl carbinol; with (B) an unsaturated polymerizable compound containing an ethylenic group selected from the class consisting of isopropenyl methyl ketone, vinyl acetate, acrylic acid esters of saturated monohydric alcohols, methacrylic acid esters of unsaturated monohydric alcohols, methacrylic acid esters of saturated monohydric alcohols, styrene, ethylene glycol ester of monoallyl maleate, diethylene glycol ester of monoallyl maleate, glycerol esters of monoallyl maleate, pentaerythritol ester of monoallyl maleate, polyhydric alcohol esters of monoallyl phthalate, polyhydric alcohol esters of monoallyl sebacate, di (hydroxyethoxy) benzene diester of monoallyl maleate, diallyl maleate, diallyl phthalate, diallyl fumarate, and diallyl sebacate.

10. The method as set forth in claim 9 in which the dicarboxylic acid is maleic acid.

11. The method as set forth in claim 9 in which the mono-ester is mono-allyl maleate.

12. The method as set forth in claim 9 in which the drying oil acids are linseed oil acids and the mono-ester is mono-allyl maleate.

13. The method as set forth in claim 9 in which the drying oil acids are soya bean oil acids and the mono-ester is mono-allyl maleate.

14. The method as set forth in claim 9 in which the polymerizable compound containing an ethylenic group is styrene.

15. The method as set forth in claim 9 in which the polymerizable compound containing an ethylenic group is vinyl acetate.

16. The method as set forth in claim 9 in which the polymerizable compound containing an ethylenic group is ethyl acrylate.

JOHN B. RUST.

REFERENCES CITED

The following references are of record in the file of this patent:

UNITED STATES PATENTS

| Number | Name | Date |
|---|---|---|
| 1,921,756 | Kienle | Aug. 8, 1933 |
| 2,255,313 | Ellis | Sept. 9, 1941 |
| 2,280,242 | Kropa et al. | Apr. 21, 1942 |
| 2,280,256 | Patterson | Apr. 21, 1942 |
| 2,392,710 | Wakeford et al. | Jan. 8, 1946 |
| 2,464,202 | Rust | Mar. 15, 1949 |

FOREIGN PATENTS

| Number | Country | Date |
|---|---|---|
| 548,137 | Great Britain | Sept. 28, 1942 |